Patented Jan. 3, 1950

2,493,126

UNITED STATES PATENT OFFICE 2,493,126

MANUFACTURE OF CHLORINATED PHENOXY COMPOUNDS

Reginald Thomas Foster, Birkenhead, and Nicholas Bennett, Ditton, England, assignors to Imperial Chemical Industries Limited, a corporation of Great Britain No Drawing. Application July 25, 1945, Serial No. 607,083. In Great Britain April 21, 1943

Section 1, Public Law 690, August 8, 1946
Patent expires April 21, 1963

1 Claim. (Cl. 260—521)

This invention relates to improvements in the manufacture of organic compounds, and more particularly to the manufacture of chlorinated phenoxy compounds.

It is known that 2.4-dichlorophenoxyacetic acid can be prepared by reacting sodium 2.4-dichlorophenate with monochloroacetic acid in the presence of caustic soda. Other 2.4-dichlorophenoxy derivatives have also been prepared in an analogous way. Thus 2.4-dichlorophenoxypropionic acid ethyl ester has been made from the sodium dichlorophenate and α-bromopropionic acid ethyl ester. Hitherto the trichlorophenol for this purpose has been prepared by chlorinating phenol, or o- or p-chlorophenol, and isolating the required dichloro body by fractional distillation or crystallisation.

According to the present invention a process for the manufacture of 2.4-dichlorophenoxy compounds comprises chlorinating molten phenol up to the stage corresponding to the introduction of approximately two atoms of chlorine per molecule of phenol, and subsequently reacting the resulting crude chlorinated product with an α-haloalkylcarboxylic acid in the presence of a base.

By chlorinating molten phenol in this way, the main constituent formed is the 2.4-dichlorophenol, but significant amounts of other chlorophenols are also present. We find, however, that the presence of these other chlorophenols during the subsequent preparation of the 2.4-dichlorophenoxy derivative does not introduce any substantial amount of impurity into the final product, nor is the ease of carrying out the process affected, so that it is possible to obtain the 2.4-dichlorophenoxy derivative in a substantially pure form from the crude dichlorophenol. It is thus possible to avoid the troublesome and time-consuming steps of isolating the pure intermediate compound.

In carrying out the chlorination the proportion of chlorine caused to combine with the phenol should be between 1.85 and 2.25 atoms, and preferably between 2.0 and 2.25 atoms of chlorine per molecule of phenol. The maximum content of the required dichlorophenol in the chlorinated material is then secured. If desired, the increase in chlorine content of the phenol during chlorination may be followed by measuring the weight of chlorine introduced. We find, however, that as the introduction of chlorine proceeds the setting point of the material undergoing chlorination reaches a maximum at a value corresponding to the optimum proportion of chlorine. Conveniently, therefore, the chlorination is continued up to the stage where the setting point reaches this maximum value, as described in copending application Serial No. 607,082, filed July 25, 1945, now Patent No. 2,440,602. This maximum setting point is approximately 37° C. but a material suitable for the subsequent production of the phenoxy derivative can be obtained by chlorinating to a setting point above 34° C. If desired the density of the chlorinated material under specified conditions may be correlated with the setting point and the chlorination continued until a predetermined density of the chlorinated material is attained. Thus a chlorination to a setting point above 34° C. corresponds to a density at 40° C. between 1.40 and 1.42 gms./ml. Conveniently the chlorination is carried out at a temperature between 80° C. and 90° C. using cooling to prevent undue rise in temperature.

The subsequent steps of converting the dichlorophenol to the phenoxy derivative may be carried out by the customary procedure. Thus, in preparing 2.4-dichlorophenoxyacetic acid, the crude dichlorophenol obtained by chlorinating phenol as described above is mixed with a base, for example an aqueous solution of caustic soda, in amount corresponding to a slight excess of caustic soda over that equivalent to both the phenol and the acid with which it is to be reacted. Suitably the caustic soda solution contains approximately 20% caustic soda. Monochloroacetic acid is then added in the amount stoichiometrically equivalent to the phenol submitted to chlorination and the reaction mixture boiled under reflux for several hours and then allowed to cool. The sodium salt of 2.4-dichlorophenoxyacetic acid is thereby precipitated and may be filtered off, if desired, using a vacuum filter, washed with a little cold water, and dried in vacuo. The sodium salt of 2.4-dichlorophenoxyacetic acid thus obtained may, if desired, be converted into the corresponding acid by dissolving in water, acidifying with a strong acid, and recrystallising the acid, which is thereby precipitated, from a suitable solvent such as toluene or petrol ether.

Instead of using caustic soda in the above condensation reaction, it is possible to use other basic substances, for example, other alkali metal hydroxides, alkaline earth metal hydroxides, or alkali metal carbonates. The dichlorophenol may also be reacted with other monochloroalkylcarboxylic acids, for example α-chloropropionic acid, α-chlorobutyric acid, or α-chloroisobutyric acid; the corresponding bromo acids may also be used. With some bases, and with some α-haloalkylcarboxylic acids, the salt of the phenoxy acid produced may be to a large degree insoluble in the reaction mixture, and may be isolated from it by filtration, decantation or like method, as in the case of the sodium salt of dichlorophenoxyacetic acid whose preparation is described above. The calcium salt of the dichlorophenoxypropionic acid also has suitable solubility characteristics for this method of recovery to be feasible, while the sodium salt of the same acid is soluble in the reaction mixture, and cannot be recovered by the same procedure. In such cases and also, if desired, where the salt formed separates, at least in part, from the reaction mixture, the product may be recovered as the free acid by adding sufficient mineral acid to the reaction mixture after the condensation to render it acid. In general the acid itself then separates from the reaction mixture and can be separated by decantation or filtration, or it may be extracted with a suitable solvent such as ether, toluene, or carbon tetrachloride.

If desired, 2.4-dichlorophenoxy acids or the corresponding salts produced may be converted into other 2.4-dichlorophenoxy compounds, i. e. other compounds containing the radical

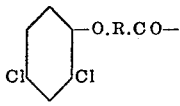

where R is the radical corresponding to the haloalkylcarboxylic acid with which the chlorophenol is reacted. Thus other salts may be produced by neutralisation of the acid with the appropriate base or, in the case of insoluble salts, from a soluble salt by double decomposition. The acid may also be converted into an alkyl ester by treatment with the corresponding alcohol in the presence of a strong mineral acid, such as sulphuric acid. Such esters as the methyl, ethyl, propyl, isopropyl, butyl, isobutyl esters may be so prepared.

The following examples illustrate but do not limit our invention, all parts being parts by weight.

*Example 1*

250 parts of phenol were charged into a vessel fitted with a thermometer, an inlet for chlorine, an outlet for hydrogen chloride through a condenser, heating means, and cooling means. The vessel was heated until the phenol was molten, and after stopping the heating chlorine was introduced at the rate of 19 parts per hour. Evolution of heat took place and the temperature was allowed to rise to 80° C. Cooling was then commenced and the temperature maintained between 80° C. and 90° C. for the remainder of the chlorination. When rather less than the theoretical amount of chlorine for the formation of the dichloro body had been introduced, small samples were taken out at intervals and their setting point determined by allowing each sample to cool in an air jacketed glass tube while stirring it, and noting the temperature at which solidification occurred. When a sample was obtained having a setting point of 37° C., the further introduction of chlorination was stopped. 380 parts of chlorine had then been passed into the phenol and the product weighed 430 parts.

The product was mixed with 235 parts of caustic soda dissolved in 940 parts of water, and 255 parts of monochloroacetic acid were added. The resultant reaction mixture was boiled under reflux for 4 hours and then allowed to cool. The product was filtered using a vacuum filter, washed with a small amount of cold water, and dried in vacuo at 50° C. An 80% yield of sodium 2.4-dichlorophenoxyacetate was thus obtained, calculated on the phenol.

The sodium compound was converted to the corresponding acid by treatment with aqueous hydrochloric acid, and recrystallised from toluene; 2.4-dichlorophenoxyacetic acid was thus obtained melting at 138° C.

100 parts of the dry 2.4-dichlorophenoxyacetic acid were dissolved in 400 parts of methanol, and 138 parts of concentrated sulphuric acid were added with stirring. The methyl ester thereby formed separated from the reaction mixture as an oil almost immediately and on cooling it solidified. After allowing the mixture to stand for several hours the solid was filtered off, washed with water, and dried. 95 parts of ester were thus obtained melting at 43° C. Recrystallisation from petrol ether did not alter the melting point.

*Example 2*

75 parts of crude 2.4-dichlorophenol obtained as in Example 1 were mixed with 43 parts of sodium hydroxide, 150 parts of water, and 50 parts of α-chloropropionic acid and the mixture was refluxed for 6 hours. The reaction mixture was then acidified and the precipitated oil extracted with ether. The ethereal solution so obtained was extracted with an aqueous solution of sodium bicarbonate and α-(2.4-dichlorophenoxy)-propionic acid was precipitated from the aqueous extract by acidification with hydrochloric acid, filtered off, and dried. 30.6 parts of crude α-(2.4-dichlorophenoxy)-propionic acid were thus obtained which after crystallisation from toluene melted at 115° C. to 117° C.

*Example 3*

49 parts of crude 2.4-dichlorophenol obtained as in Example 1 were mixed with 30 parts of sodium hydroxide, 100 parts of water and 50 parts of α-bromo-n-butyric acid, and the mixture was refluxed for 6 hours. α-(2.4-dichlorophenoxy)-n-butyric acid was isolated as in Example 2. 24.7 parts of crude acid were thus obtained. After one recrystallisation from petrol ether (B. P. 60° C. to 80° C.) the acid melted at 80° C.

We claim:

In a process for the manufacture of 2,4-dichlorophenoxy compounds, the step which comprises taking the product obtained by chlorinating molten phenol up to the stage corresponding to the combination with phenol of between 1.85 and 2.25 atoms of chlorine per molecule, said product having a setting point above 34° C. and a density at 40° C. between 1.40 and 1.42 gm./ml. and reacting said product with an alpha-haloalkylcarboxylic acid in the presence of a base.

REGINALD THOMAS FOSTER.
NICHOLAS BENNETT.

REFERENCES CITED

The following references are of record in the file of this patent:

UNITED STATES PATENTS

| Number | Name | Date |
|---|---|---|
| 554,938 | Lederer | Feb. 18, 1896 |
| 2,322,761 | Lontz | June 29, 1943 |

OTHER REFERENCES

Holleman: Rec. des Trav. Chim. des Pays-Bas, vol. 37, pp. 96–98 (1918).

Pokorny: J. Am. Chem. Soc., vol. 63, page 1768 (1941).